(12) United States Patent
Miettinen

(10) Patent No.: US 9,719,210 B2
(45) Date of Patent: Aug. 1, 2017

(54) CONTINUOUS METHOD FOR THE PRECIPITATION OF LIGNIN FROM BLACK LIQUOR

(71) Applicant: UPM-Kymmene Corporation, Helsinki (FI)

(72) Inventor: Mauno Miettinen, Lappeenranta (FI)

(73) Assignee: UPM-KYMMENE CORPORATION, Helsinki (FI)

( * ) Notice: Subject to any disclaimer, the term of this patent is extended or adjusted under 35 U.S.C. 154(b) by 70 days.

(21) Appl. No.: 14/825,363

(22) Filed: Aug. 13, 2015

(65) Prior Publication Data

US 2015/0345076 A1    Dec. 3, 2015

Related U.S. Application Data

(62) Division of application No. 13/879,085, filed as application No. PCT/FI2011/050896 on Oct. 14, 2011, now Pat. No. 9,139,606.

(30) Foreign Application Priority Data

Oct. 15, 2010  (FI) .................................... 20106073
May 11, 2011   (FI) .................................... 20115452

(51) Int. Cl.
*D21C 11/10*    (2006.01)
*B01J 3/02*     (2006.01)
(Continued)

(52) U.S. Cl.
CPC ................. *D21C 11/10* (2013.01); *B01J 3/00* (2013.01); *B01J 3/02* (2013.01); *B01J 3/042* (2013.01);
(Continued)

(58) Field of Classification Search
CPC ....... B01J 3/04; B01J 3/042; B01J 3/02; B01J 3/00; C07G 1/00
See application file for complete search history.

(56) References Cited

U.S. PATENT DOCUMENTS 2,623,040 A    12/1952   Keilen, Jr. et al.
2,828,297 A    3/1958    Giesen
(Continued)

FOREIGN PATENT DOCUMENTS

WO    WO 92/13849 A1     8/1992
WO    WO 2006/031175 A1  3/2006
(Continued)

OTHER PUBLICATIONS

International Search Report for corresponding International Patent Application No. PCT/FI2011/050896 mailed Dec. 27, 2011.
(Continued)

*Primary Examiner* — Lessanework Seifu
(74) *Attorney, Agent, or Firm* — Nixon Peabody LLP

(57) ABSTRACT

In a method for the continuous precipitation of lignin from black liquor black liquor is provided so as to flow as a pressurized flow in a reactor with a dwell time of less than 300 s. An acidifying agent selected from the group of carbon dioxide, acid and their combinations is led to the flow at one or more feeding sites to lower the pH of black liquor. The pH is allowed to decrease by the effect of the acidifying agent in the pressurized flow to the precipitation point of lignin, the pressure of the pressurized flow is abruptly released, and lignin particles are separated from black liquor.

12 Claims, 4 Drawing Sheets

(51) Int. Cl.
   *B01J 3/04* (2006.01)
   *B01J 3/00* (2006.01)
   *C07G 1/00* (2011.01)
   *D21C 11/00* (2006.01)
   *D21C 11/04* (2006.01)

(52) U.S. Cl.
   CPC ............ *C07G 1/00* (2013.01); *D21C 11/0007* (2013.01); *D21C 11/04* (2013.01)

(56) References Cited

U.S. PATENT DOCUMENTS

| | | | |
|---|---|---|---|
| 2,997,466 | A | 8/1961 | Ball et al. |
| 3,048,576 | A | 8/1962 | Ball et al. |
| 3,223,697 | A | 12/1965 | Ball et al. |
| 4,075,248 | A | 2/1978 | Marshall et al. |
| 4,470,876 | A | 9/1984 | Beaupre et al. |
| 4,764,596 | A | 8/1988 | Lora et al. |
| 6,770,168 | B1 | 8/2004 | Stigsson |
| 8,628,623 | B2 | 1/2014 | Bolles et al. |
| 2010/0041879 | A1 | 2/2010 | Stigsson et al. |
| 2010/0108274 | A1 | 5/2010 | Ako et al. |
| 2011/0294991 | A1 | 12/2011 | Lake et al. |
| 2012/0168101 | A1 | 7/2012 | Chen et al. |

FOREIGN PATENT DOCUMENTS

| | | |
|---|---|---|
| WO | WO 2006/038863 A1 | 4/2006 |
| WO | WO 2008/079072 A1 | 7/2008 |
| WO | WO 2011/026243 A1 | 3/2011 |
| WO | WO 2011/037967 A2 | 3/2011 |

OTHER PUBLICATIONS

Nikitin, V. et al., "Precipitation of lignin from black liquor by carbon dioxide gas under pressure", *Nauchnye Trudy-Lenigradskaya Lesotekhnicheskaya Akademiya imeni S.M. Korova*, 85: 12-19, (1960), Abstract only, CAPLUS [online][retrieved Dec. 15, 2011], retrieved from STN International, USA, Accession No. 1960:134932.

Alen, R. et al., "Carbon Dioxide Precipitation of Lignin from Alkaline Pulping Liquors", *Cellulose Chemistry Technol*, 19: 537-541, (1985).

Howell, J. et al., "Hardwood Lignin Recovery Using Generator Waste Acid, Statistical Analysis and Simulation", *Ind. Eng. Chem. Res.*, 39: 2534-2540, (2000).

Supplementary European Search Report for corresponding European Patent Application No. 11832197 mailed Mar. 11, 2014.

CONTINUOUS METHOD FOR THE PRECIPITATION OF LIGNIN FROM BLACK LIQUOR

This application is a Divisional of U.S. Ser. No. 13/879,085, filed 12 Apr. 2013, which is a National Stage Application of PCT/FI2011/050896, filed 14 Oct. 2011, which claims benefit of Serial No. 20106073, filed 15 Oct. 2010 in Finland and Serial No. 20115452, filed 11 May 2011 in Finland and which applications are incorporated herein by reference. To the extent appropriate, a claim of priority is made to each of the above disclosed applications.

FIELD AND BACKGROUND OF THE INVENTION

This invention relates to a continuous method for the precipitation of lignin from black liquor, in which method the pH of black liquor is lowered to the precipitation point of lignin and precipitated lignin is separated from black liquor. The invention also relates to an apparatus for the precipitation of lignin.

Lignin is the second most general biopolymer in the world after cellulose. Chemically, it is a heavily branched polyphenol that is an amorphous substance irregular in structure, closely bonded to wood fibers and difficult to separate in the processing of wood. In the preparation of chemical pulp, lignin is separated from wood fibers in the cooking of pulp, whereby it is dissolved in the cooking liquor. The black liquor obtained in sulfate cooking contains cooking chemicals, lignin dissolved from wood, and other substances dissolved from wood. When lignin dissolves in the sulfate cooking, its structure is also altered relative to the native lignin.

Being an organic biopolymer containing a great deal of carbon, lignin has a heating value, and the lignin remaining in black liquor has traditionally been burnt in the soda boiler of the pulp mill to produce heat and electricity. Lignin can also be separated from black liquor and used for the manufacture of different chemicals. As the synthesis methods are developing or new applications of use are being discovered, the importance of lignin as raw material in different products may grow, whereby lignin will be separated in a greater deal for further processing. Therefore, different methods for separating lignin from black liquor have been developed.

A general method for the separation of lignin is precipitation. Lignin remains dissolved within the heavily alkaline pH range of black liquor. When the pH decreases below 10, most of the lignin is precipitated as the phenolic hydroxyl groups it contains are being neutralized. Since the precipitation of lignin is based on the reduction of its solubility as the pH decreases, any pH decreasing acidifying agent, for example sulfuric acid or carbon dioxide, is used as a precipitation chemical to be added to black liquor. Since black liquor from which lignin has been precipitated is returned to the chemical circulation of the pulp mill, the use of acid generates substances interfering with the chemical balances of the circulation. Therefore, carbon dioxide is a widely used precipitation chemical that is led to black liquor in a gaseous state. Precipitated lignin can be separated from black liquor by filtering.

Known from international publication WO2009/104995 is a method for the precipitation of lignin, wherein lignin is precipitated from black liquor preferably by using carbon dioxide. Precipitation is typically followed by an "ageing", or "maturing", step, the intention of which is to raise the particle size of precipitated lignin before separating it by filtration, preferably pressure filtration. After filtration, lignin is washed by a filtrate obtained from a subsequent resuspension and filtration step, the ion strength and pH of the filtrate being adjusted if necessary.

Methods for the precipitation and separation of lignin from black liquor by acidification have also been disclosed in international publications WO2006/031175 and WO2006/038863.

All three patents focus on the filtration and washing of the obtained lignin and on the circulation of different solutions. In addition, it can be concluded that they use a batch reactor to precipitate lignin.

International publication WO2008/079072 discloses a method wherein lignin is precipitated from a black liqueur flow obtained from the evaporation plant by lowering the pH to below 10.5 using carbon dioxide. Precipitated lignin is washed in at least one step by a washing solution that includes calcium and magnesium ions to replace sodium so as to obtain lignin that has a low sodium content.

Known from U.S. Pat. No. 2,623,040 is a method wherein lignin is precipitated from black liquor by first leading combustion gases in a counterflow direction relative to the black liquor through two columns, after which the black liquor thus acidified is heated to a temperature of more than 75° C. and provided in a mild mixing by letting it flow through a tubular heater wherein the pressure is kept constant and above the vapor pressure corresponding to the temperature. The description of the patent discloses that black liquor is actually led via an externally heated coil. When black liquor thus processed is finally cooled, coagulated lignin is obtained that is easy to filter. It is particularly mentioned in the patent that the intensity of the mixing that is expressed as the Reynolds number affects the size of coagulated particles, and, according to tests, the Reynolds numbers of more than 2000 (corresponding to turbulence) resulted in such small particles sizes (1 to 7 μm) that lignin was practically impossible to filter.

Article R. Alén, E. Sjöström, P. Vaskikari "Carbon dioxide precipitation of lignin from alkaline pulping liquors" Cellulose Chemistry Technol., 19 537-541 (1985) discloses the processing of black liquor in an autoclave at a pressure of 800 kPa (approximately 8 bar), wherein black liquor samples were saturated with carbon dioxide so as to have a final pH of 8.7 after a 60 minute treatment. The lignin thus precipitated was separated by centrifugation. Carbonation carried out at a high pressure was discovered to increase the yield from black liquor. The employed device was a normal laboratory autoclave, wherein the pressure is slowly decreased before opening the autoclave and extracting the samples, and it is comparable to a batch process. The publication discusses factors affecting the precipitation of lignin and does not disclose an industrial process.

Article J. F. Howell, R. W. Thring "Hardwood lignin recovery using generator waste acid. Statistical analysis and simulation" Ind. Eng. Chem. Res., 39 2534-2540 (2000) models, on the basis of laboratory tests, the precipitation of lignin by means of waste acid obtained from the production of chlorine dioxide. In the conclusions, it is stated that, for the filterability of precipitated lignin, it is preferred to use as small a mixing rate as possible in the process.

The drawback of the batch process is the large reaction vessel it requires and the need to direct hydrogen sulfide separated from black liquor in connection with acidification away so as not to constitute a hazard. If carbon dioxide is used as the acidifying agent, which is preferred for the chemical balance of the pulp mill, acidification takes a lot of time in a normal-sized vessel. Reaction times for the precipitation of lignin are at least 30 minutes, after which there is yet the ageing step. Such a batch process does not allow for fast changes in the process conditions.

Continuous methods have also been disclosed, one example of which is the above-mentioned U.S. Pat. No. 2,623,040. However, to date, there has not been disclosed a method wherein particles sufficiently large for the separation of lignin, for example agglomerated particles, could be continuously produced with a short dwell time. After acidification, whether effected by carbon dioxide or acid, there has traditionally been the so-called "ageing" step where the particle size has been allowed to grow so as more easily to separate precipitated lignin from black liquor for later processing. This is also the case in the treatment disclosed in the above-mentioned U.S. Pat. No. 2,623,040 in the tubular heater after acidification. Such post-processing steps require additional process vessels and other devices and the dwell times become long.

SUMMARY OF THE INVENTION

The objective of the invention is to disclose a method for the continuous production of lignin having a suitable particle size with a short dwell time in an industrial scale. Another objective of the invention is to disclose a continuous method for the continuous processing of large amounts of black liquor with low operating costs allowing fast changes in the process conditions.

To achieve this objective, the method is mainly characterized in that black liquor is made to flow as a pressurized flow in a reactor with a dwell time of less than 300 s, an acidifying agent is led to the flow, selected from the group of carbon dioxide, acid and their combinations, at one or more feeding sites to lower the pH of black liquor, the pH is allowed to decrease in the pressurized flow to the precipitation point of lignin by the effect of the acidifying agent, the pressure of the pressurized flow is suddenly released, and lignin particles are separated from black liquor.

The method provides such precipitated lignin with a short dwell time in the reactor, preferably a tubular reactor, which is suitable, in terms of its particle size, to be directly separated by a traditional separation method and which need not be aged.

Preferred embodiments of the invention are disclosed in the accompanying dependent claims and the following description.

BRIEF DESCRIPTION OF THE DRAWINGS

In the following section, the invention will be described in detail with reference to the accompanying drawings, in which.

DETAILED DESCRIPTION OF THE INVENTION

In this description, the following terms have the meanings disclosed thereafter.

Lignin refers to native lignin (lignin attached to wood material), dissolved lignin in a solution or precipitated lignin, depending on the context. The above-mentioned lignins are not necessarily chemically similar to each other.

Black liquor refers to a basic aqueous solution obtained from the cooking of sulfate pulp wherein lignin attached to wood material has dissolved in connection with the cooking of the wood material in the manufacture of chemical pulp derived from wood fibers of the wood material. This solution may be obtained as such from the cooking or it may be concentrated (obtained from the evaporation plant).

Acidification refers to the reduction of the pH of a liquid, in this case black liquor, by adding an acidifying agent in the liquid.

An acidification agent is any agent that, in a solid, liquid or gaseous state, lowers the pH of a liquid when added thereto.

The precipitation point of lignin refers to the pH of black liquor at which lignin is precipitated. It may vary according to the desired lignin yield and has no single absolute value.

Lignin particles refer to parts of lignin in a solid state that are separable from a liquid phase by separation methods described below. The size of lignin particles may vary and they can be individual particles formed in the precipitation or agglomerates of such individual particles.

Separation of precipitated lignin refers to a separation method by which solid lignin particles can be separated from a liquid, such as filtration and centrifugation.

Figure 1:
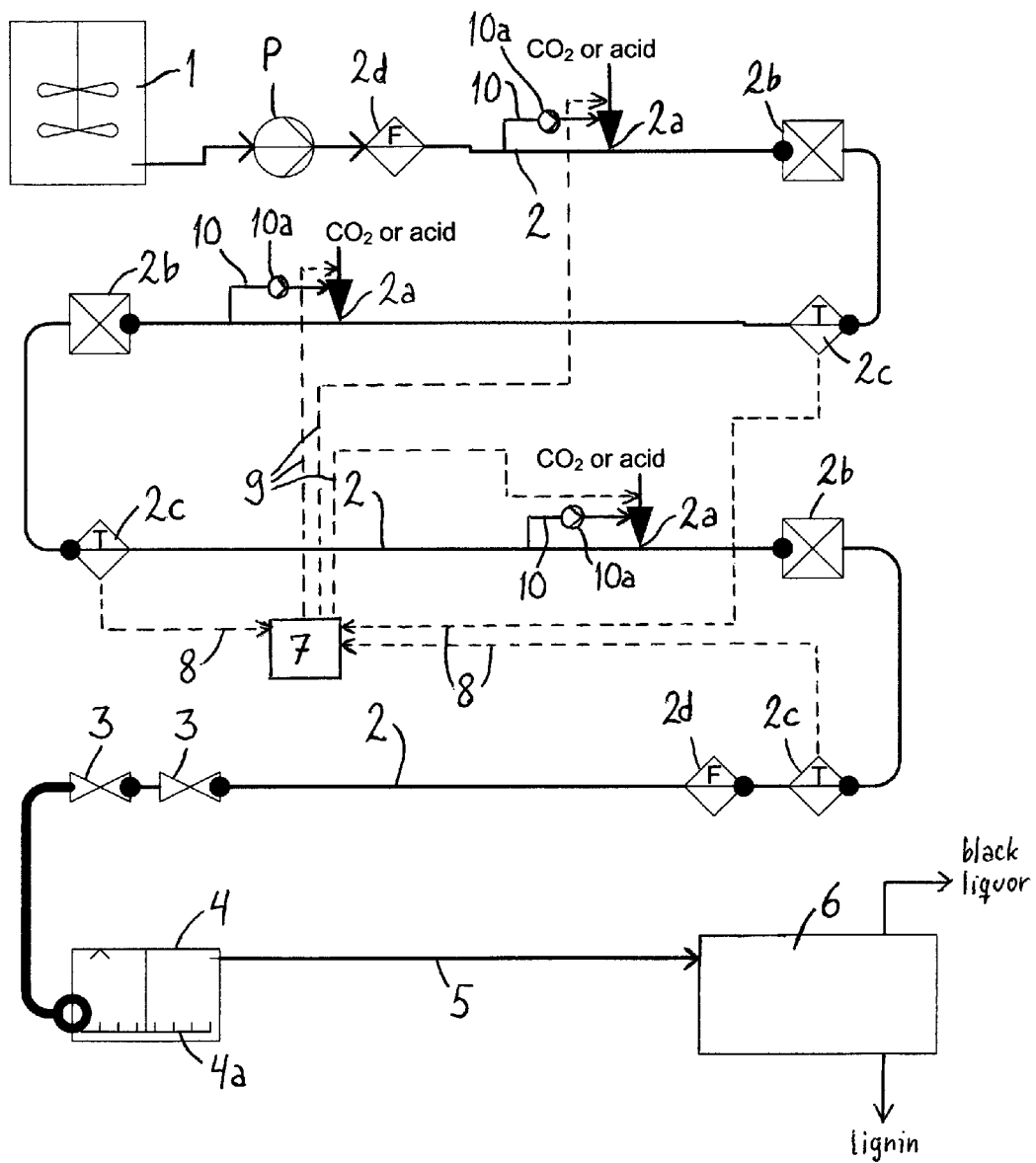
FIG. 1 illustrates the method as a process flow chart.

FIG. 1 illustrates the method according to the invention as a process flow chart. It also introduces the parts of the apparatus carrying out the method.

The apparatus includes a black liquor vessel 1 provided with a mixer, wherein black liquor derived from the cooking of pulp is fed. In addition to dissolved lignin, black liquor includes cooking chemicals and other substances dissolved from wood material in the cooking. Black liquor contains e.g. sodium, hydroxide, hydrogen sulfide and sulfide ions. However, the composition of black liquor varies, depending on the wood species and the process. Black liquor can be extracted into the black liquor vessel in a suitable concentration from the black liquor obtained after cooking or from the evaporation plant of black liquor. Part of the black liquor can be directed to the precipitation of lignin and returned back after separation of the lignin, whereby it flows with the rest of the black liquor through the evaporation plant to be burnt in the soda boiler.

The black liquor vessel 1 is connected through a pump P to a tubular reactor 2 that includes at least one acidifying agent feeding site 2a. The acidifying agent feeding site 2a is disposed on the wall of the tubular reactor 2 and includes a suitable feeding device, such as a nozzle, to lead the acidifying agent into the tubular reactor and to the flow passing therein. The nozzle is connected by a line to a source of the acidifying agent, for example a vessel containing the acidifying agent. In FIG. 1, there are more than one such acidifying agent feeding sites 2a disposed at a distance from each other in the flow direction determined by the tubular reactor 2. Disposed after each acidifying agent feeding site 2a there is a static mixer 2b. In addition, the tubular reactor includes at least one pH and temperature measurement site 2c and a flow meter 2d. There may also be more than one of these disposed at a distance from each other, as in FIG. 1.

The tubular reactor 2 includes a pressurized portion starting from the pump P and ending at one or more pressure release valves 3. Within this portion, black liquor flows as a pressurized flow. There are two pressure release valves 3 in a series in FIG. 1, and they are arranged to reduce the pressure of black liquor flowing in the tubular reactor 2 to atmospheric pressure. The valves of the figure are arranged gradually to reduce the pressure, but the reduction may also be carried out using a single valve. However, the change of pressure from the pressure of the tubular reactor to atmospheric pressure is abrupt, irrespective of the number of valves. Preferably, the diameter of the tube is larger after the pressure release valves 3. This way, intensive mixing conditions are provided immediately after the pressure drop as black liquor is discharged from a small opening into an open space.

The tubular reactor ends at an aeration vessel 4, the lower part of which is provided with an aerator 4a, by which hydrogen sulfide developed from black liquor due to the decrease in the pH can be separated as a gas along with the aeration air and led to the removal of gas (not shown) so that it will not be released in the ambient air. The aeration vessel 4 also acts as a balancing vessel from which black liquor that includes precipitated lignin can be extracted for further processing, i.e. separation 6 of lignin, through a tube 5. Black liquor from which precipitated lignin has been separated can be returned to the processing of black liquor at the pulp mill, for example to the evaporation plant.

Black liquor flows from the black liquor vessel 1 pumped by the pump P along the pressurized portion of the tubular reactor 2 wherein the acidifying agent is led to the black liquor at one or more acidifying agent feeding sites 2a, and the flow of the black liquor is mixed after each feeding site. When the pH drops to the precipitation point of lignin due to the acidifying agent (a value below 11.5), the lignin starts to be precipitated into black liquor in the pressurized portion of the tubular reactor 2. A good yield of lignin is achieved when the pH drops to 10 or below. Precipitated lignin is brought to the aeration vessel 4 with the flow of black liquor.

Below, the conditions used for the precipitation of lignin are presented in more detail. Black liquor is led to the tubular reactor 2 at a temperature that is preferably in the range of 60 to 85° C., more preferably in the range of 60 to 80° C., in the range of 65 to 80° C. or in the range of 65 to 75° C. Black liquor may already have this temperature after cooking or evaporation, whereby it need not be heated or cooled. Due to the short dwell time, there is no time for black liquor substantially to cool in the tubular reactor. The process pressure in the pressurized portion of the tubular reactor 2 is preferably in the range of 200 to 1000 kPa overpressure (approximately 2 to 10 bar), more preferably 400 to 700 kPa or 300 to 600 kPa. For precipitation, the overpressure may also be higher than 1000 kPa but this increases the production costs of the reactor.

The acidifying agent is carbon dioxide that is led in a gaseous state at a high pressure using a suitable nozzle to the feeding site 2a into the pressurized flow of black liquor. Carbon dioxide can be led from a source of carbon dioxide, for example a carbon dioxide vessel, to the nozzle via a line that includes an adjustment device, for example a valve, to adjust the flow, and that can be controlled by an actuator that can be connected to the control automatics of the apparatus. Another alternative is to use acid or a combination of acid and carbon dioxide as the acidifying agent. In one alternative embodiment, the employed acidifying agent may be a combination of acid and carbon dioxide that includes carbon dioxide by 1 to 30%, more preferably 15 to 25%. The employed acid may be e.g. sulfuric acid or acidic sodium sesquisulfate produced as a side product from chlorine dioxide production, or other acid suitable for the purpose of use, or their combinations. Disposed after the feeding site there is the static mixer 2b that is a structure located between the two tubes of the tubular reactor, directing the flow in directions differing from the main direction thereof, that provides for the flowing black liquor an intensive mixing of high shear forces and a turbulence and, at the same time, the mixing of carbon dioxide and furthermore its even dissolution in the flow. The known static mixers may be used.

Another alternative is to replace the static mixer 2b with the mixing provided per se by the agent fed at the feeding site 2a into the flow. When carbon dioxide is led with a sufficiently high pressure at the feeding site 2a into the flow of black liquor perpendicularly to the direction of the flow of the black liquor, it provides the mixing of the flow with high shear forces throughout its flow cross-sectional area and a turbulence and, at the same time, the mixing of the carbon dioxide evenly into the flow. If necessary, to enhance the mixing, carbon dioxide can be led to the feeding site 2a from different sides, for example at specific intervals, by nozzles disposed on the circumference of the tube of the tubular reactor. In the process flow chart of FIG. 1, the combinations of the feeding site 2a and the static mixer 2b can be replaced with the mere mixing provided by the feeding of the acidifying agent to the feeding site 2a. The mixing unit may also consist of a short dwell time apparatus by which high shear forces are provided.

The turbulent mixing can also be obtained by a secondary flow 10 drawn from the pressurized flow of the reactor 2 that is led back to the reactor via a booster pump 10a. The acidifying agent can be fed into this secondary flow, whereby the secondary flow flows into the reactor at the same feeding site 2a as the acidifying agent, or the acidifying agent and the secondary flow are fed to the reactor 2 separately from each other. This type of a combined feeding device and mixer is known for example under the trademark TrumpJet®.

The dissolution of carbon dioxide in water and aqueous liquids is enhanced under pressure, whereby it is preferable to use such a tubular reactor 2, wherein black liquor can be made to flow at a suitably high pressure.

The tubular reactor 2 includes, after each acidifying agent feeding site 2a and the following static mixer 2b (if used), a pH and temperature measurement site 2c, wherein sensors measuring the pH and temperature of black liquor are disposed. By means of the measured pH, the feeding amount of the acidifying agent at the feeding site 2a can be adjusted for example to maintain a preset value determined for the measurement site 2c. The feeding site 2a may include a sensor measuring the amount of the acidifying agent that has been fed so as to be able to monitor the consumption thereof. In FIG. 1, the adjustment unit is indicated by reference number 7. The figure also shows data transfer lines 8 between the adjustment unit 7 and the sensors measuring the pH, and data transfer lines 9 for sending control messages generated on the basis of the measurement data from the adjustment unit 7 to the actuators controlling the feeding of the acidifying agent. It is a closed control loop by which feedback control can be performed according to normal control principles.

If there are two or more sequential acidifying agent feeding sites 2a in the pressurized portion of the tubular reactor 2, the metering of the acidifying agent can be divided evenly for the length of the tubular reactor so that new amounts of lignin are always precipitated from black liquor after each feeding site 2a.

By using carbon dioxide as the acidifying agent, the pH of black liquor in the tubular reactor can be lowered from 12 to the range of 9 to 10, by which a sufficiently good precipitation and yield of lignin is provided. If acid is used as the acidifying agent, the pH can be made lower and the yield of lignin is improved, but the pH of black liquor to be returned back to the process is also reduced. To be able to return black liquor back to the process, the pH thereof must be raised to the original level by adding sodium hydroxide that must be added, in this case, excessively relative to the process that uses carbon dioxide as the acidifying agent.

The essential part of the method is the fast release of the pressure effected at the end of the pressurized portion of the tubular reactor 2 at the pressure release valves 3, i.e. the drop of the pressure that was prevailing in the pressurized portion to atmospheric pressure. This provides in black liquor an intensive mixing effect, a "flash" mixing, after which lignin will be completely precipitated and agglomerated into sufficiently large particles so as to be easily separated from the black liquor. The fast drop of the pressure effected at the end of the pressurized portion, i.e. the release of the pressure, simultaneously provides the mixing of black liquor and agglomeration of lignin particles.

If carbon dioxide was used as the acidifying agent, the carbon dioxide dissolved in the black liquor under pressure is also quickly released into a gaseous state, enhancing the mixing of the black liquor and agglomeration of lignin.

Thanks to the fast increase in the particle size of lignin, the dwell time of black liquor in the tubular reactor 2 (in the pressurized portion from the pump P to the pressure release valve 3) can be kept short, even less than 300 s, e.g. in the range of 1 to 300 s, most suitably 10 to 100 s. The volumetric flow rate of black liquor produced by the pump P is adjusted to the volume of the tubular reactor 2 so that the above-mentioned dwell times are achieved. The short dwell time allows fast changes in the process parameters that result from quality variations of black liquor.

Precipitated lignin particles form larger particles, "agglomerates", in black liquor that can be easily separated from the black liquor. The separation method is preferably pressure filtration. In pressure filtration, the "cake" formed by lignin particles can be made so dry of the filtrate that the black liquor remaining in the lignin can be more easily washed off, and the cake can be washed while disposed in the pressure filter. After pressure filtration, an acid wash is performed if necessary, where the concentrations of sodium and other inorganic components remaining in lignin are lowered. Thanks to the effective solid-liquid separation of the pressure filtration, acid is consumed in a minor amount because the proportion of residual black liquor consuming the acid has been minimized. In the scheme of FIG. 1, the pressure filter follows the aeration vessel 4. Preferably, disposed between the aeration vessel and the pressure filter there is yet a concentration device, e.g. a centrifuge or other separator, by which the concentration of lignin particles in black liquor can be raised. The separation step where lignin is separated from black liquor is generally indicated by reference number 6.

The following table compares the fast continuous method according to the invention using the pressurized tubular reactor (Fast continuous precipitation, dwell time 50 to 100 s) and a batch reactor (Slow batch precipitation) with the traditional slow dwell time (60 min) without ageing and with ageing for 13 days.

The raw material was the same black liquor (intermediate liquor) and the precipitation employed 100% CO2. The precipitation temperature was approximately 68 to 70° C. and the precipitation pH was 9.2 to 9.3. Also in the batch reactor, care was taken that the CO2 gas was not allowed to escape from the reactor.

| Parameter | Unit | Fast continuous precipitation, no ageing | Slow batch precipitation, no ageing | Slow batch precipitation, ageing 13 days |
|---|---|---|---|---|
| $CO_2$ consumption | kg $CO_2$/t black liquor | 34 | 80 | 80 |
| Lignin recovery 203 nm based on solution analysis | % | 65.5 | 46.3 | 49.8 |
| Lignin recovery 203 nm based on filtrated solids | % | 64.1 | 22.3 | 65.3 |
| Lignin recovery 280 nm based on solution analysis | % | 69.5 | 52.2 | 58.5 |
| Lignin recovery 280 nm based on filtrated solids | % | 75.1 | 24.2 | 70.8 |

The table shows that the yield of lignin is clearly better as compared to the batch processes, which is evidenced by reduced chemical costs/ton of lignin. A smaller amount of black liquor needs to be returned to the processing of black liquor and it contains less lignin. As a whole, this provides less load to the evaporation plant and the soda boiler. The continuous short dwell time tubular reactor also consumes a considerably smaller amount of energy for mixing than the slow batch reactor.

Figure 2:
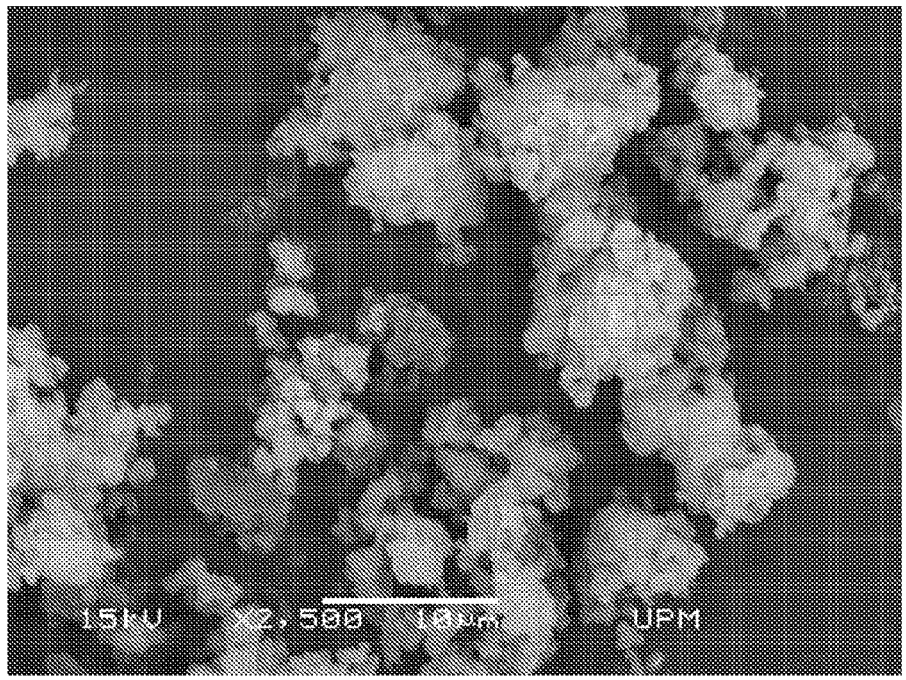
FIGS. 2 to 4 show lignin samples precipitated with different methods.
Figure 3:
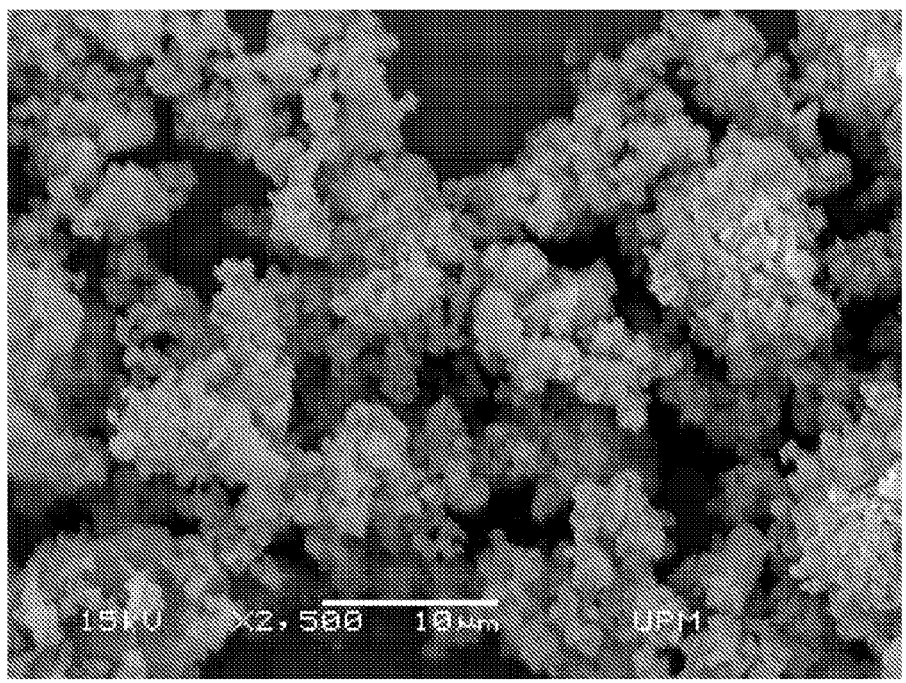
Figure 4:
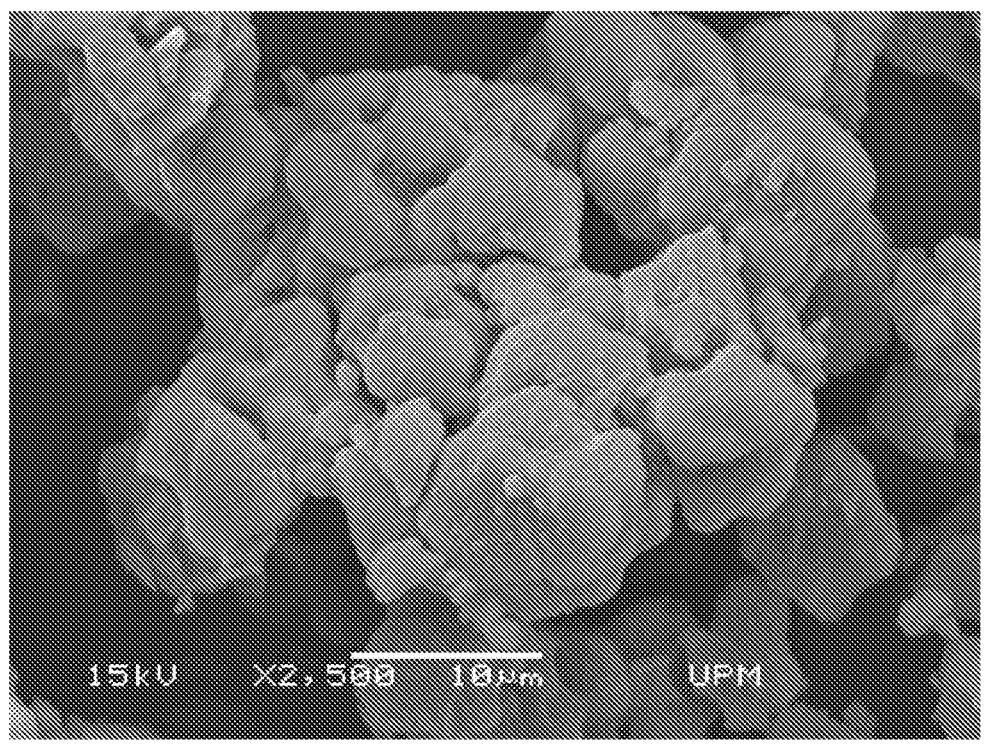

FIGS. 2 to 4 show the preferred shape of the lignin particles to be achieved by the invention. FIG. 2 is a SEM image (2500×) of lignin precipitated by the method according to the invention using carbon dioxide, FIG. 3 is a SEM image (2500×) of lignin precipitated slowly using sodium bisulfite and aged over-night, and FIG. 4 is a SEM image (2500×) of lignin precipitated slowly in a batch process using carbon dioxide, with ageing of 13 days.

By the "fast" precipitation according to the invention (dwell time of less than 300 s) using carbon dioxide as the acidifying agent, it is surprisingly possible to obtain lignin wherein precipitated small particles of a diameter of less than 2 μm form agglomerates of tens of particles that are easily separable, thanks to their sizes, from black liquor for example by filtration. When the acidifying agent is sodium bisulfite and the precipitation is performed slowly and the precipitated lignin is aged, it is also possible to achieve agglomerates formed by the particles. On the other hand, when the acidifying agent is carbon dioxide and the precipitation is performed slowly and the precipitated lignin is aged, the size of the lignin particles obtained grows without agglomeration.

By visual inspection of the precipitated lignin samples, it can be stated that, when carbon dioxide was used as the acidifying agent with the fast method according to the invention, the precipitated lignin is also lighter in color (light brown) than the lignin precipitated slowly with carbon dioxide (dark brown). Probably, the higher lightness is a result of improved scattering of light when the small particles scattering light in an optimal fashion form agglomerates. This is beneficial if the intention is to use lignin in composites but not to provide too much color.

Figure 5:
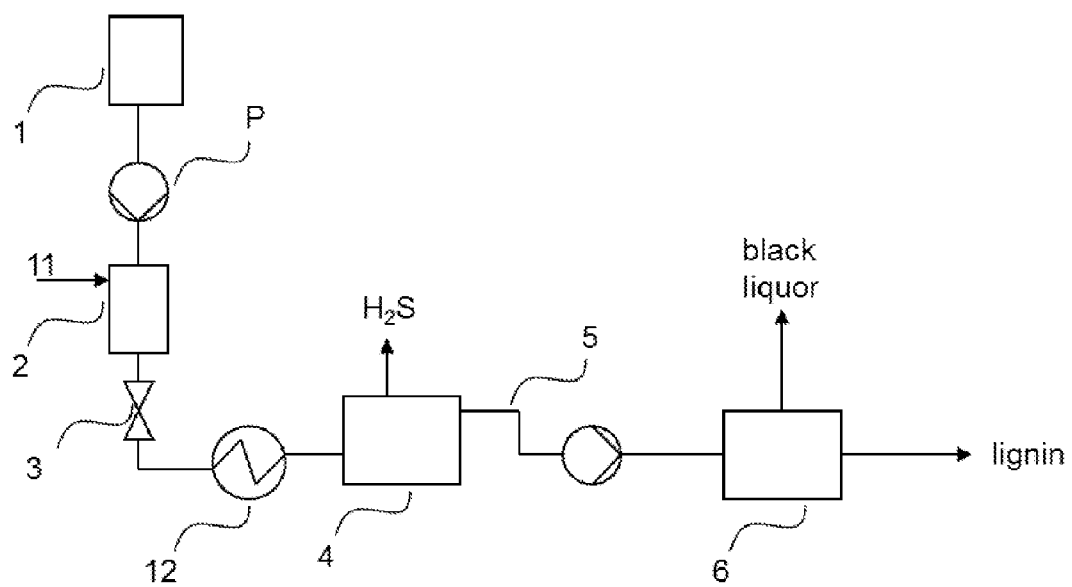
FIG. 5 illustrates one embodiment of the method as a process flow chart.

FIG. 5 presents one embodiment according to the invention as a process flow chart where lignin is precipitated from black liquor. The apparatus of FIG. 5 includes, as in FIG. 1, a black liquor vessel 1, a tubular reactor 2 with feeding sites of an acidifying agent 11, and pressure release valves 3. In addition, the apparatus includes, as in FIG. 1, an aeration vessel 4 and a lignin separation step 6 to which black liquor containing lignin is led from the aeration vessel through a tubing 5. The employed separation step 6 is pressure filtration. The apparatus of FIG. 5 also includes a heat exchanger 12 that is disposed after the tubular reactor 2 and the pressure release valves 3 to cool the black liquor containing lignin before filtration. The cooling may be effected by means of raw water, whereby the raw water heated in this connection can be utilized in other process steps or other processes. Instead of the heat exchanger, the black liquor containing lignin can be cooled after pressure release by other suitable means or device that quickly cools the black liquor to the desired temperature. The temperature of black liquor flowing from the tubular reactor and the pressure release valves is typically in the range of approximately 75 to 80° C. In a preferred embodiment, black liquor is cooled to a temperature of 40 to 60° C., more preferably to a temperature of 45 to 55° C. This way, good filterability is achieved. Another technical effect is that, in this case, a long dwell time is not needed between pressure release and filtration. Preferably, a dwell time of less than 30 min is sufficient from the reduction of temperature to filtration. Another technical effect is that an ageing vessel is not needed before filtration.

The invention is not limited to the preceding description but may be applied within the scope of the inventive idea presented in the claims. The employed acidifying agent may be any carbon dioxide containing agent. This agent is preferably pure carbon dioxide so as to reduce the pH as effectively as possible relative to the dissolved amount of gas. Alternatively, acid or a combination of acid and carbon dioxide can be used. Also, other filtration methods apart from pressure filtration can be used, and other separation methods apart from filtration may be possible.

The apparatus of FIG. 1 or FIG. 5 is most preferably located at the pulp mill, because in this case it can be easily connected to the manufacturing process of chemical pulp. The apparatus may, for example, use part of the black liquor produced by the cooking of pulp as raw material, and the black liquor can be returned therefrom back to the processing of black liquor after the separation of lignin.

The invention claimed is:

1. An apparatus for the continuous precipitation of lignin from black liquor, the apparatus comprising:
a flow-through reactor and a feeding device leading an acidifying agent into the reactor, wherein the flow-through reactor is a continuous flow-through reactor that includes a pressurized portion wherein black liquor is arranged to flow as a pressurized flow, the pressurized portion includes one or more acidifying agent feeding sites that are connected to a source of acidifying agent to lead the acidifying agent to the pressurized flow at said one or more acidifying agent feeding sites, and the pressurized portion ends at a pressure release valve that is configured to cause an abrupt release of pressure of the pressurized flow such that the black liquor is intensively mixed upon release of the pressure.

2. The apparatus according to claim 1, wherein, disposed after the one or more acidifying agent feeding sites, there is a static mixer that is arranged to provide turbulent mixing of the flow.

3. The apparatus according to claim 1, wherein the acidifying agent and/or a secondary flow separated from the pressurized flow are arranged to be led to the pressurized flow at the feeding site at such a pressure as to provide turbulent mixing of the flow.

4. The apparatus according to claim 1, wherein the apparatus comprises a filter that is arranged to separate lignin particles from black liquor.

5. The apparatus according to claim 4, wherein the filter is a pressure filter.

6. The apparatus according to claim 4 wherein, before the filter, there is a concentration device that is arranged to raise the proportion of lignin particles in the black liquor.

7. The apparatus according to claim 1, wherein the apparatus comprises a cooling device for cooling the black liquor containing lignin, and the cooling device is disposed after the pressure release valve.

8. The apparatus according to claim 7, wherein the employed cooling device is a heat exchanger.

9. The apparatus of claim 6, wherein the concentration device is a centrifuge.

10. The apparatus of claim 1, wherein the flow-through reactor includes a plurality of tubes to facilitate flow of the black liquor through the flow-through reactor, a diameter of a first tube after the pressure release valve being larger than a diameter of a second tube before the pressure release valve.

11. The apparatus of claim 1, wherein the reactor is configured to facilitate volumetric flow of the black liquor therethrough such that a dwell time of about 1 second to about 300 seconds may be achieved.

12. The apparatus of claim 11, wherein the dwell time is from about 10 seconds to about 100 seconds.

* * * * *

(12) EX PARTE REEXAMINATION CERTIFICATE (11482nd)
United States Patent
Miettinen

(10) Number: US 9,719,210 C1
(45) Certificate Issued: Mar. 18, 2019

(54) CONTINUOUS METHOD FOR THE PRECIPITATION OF LIGNIN FROM BLACK LIQUOR

(71) Applicant: UPM-Kymmene Corporation, Helsinki (FI)

(72) Inventor: Mauno Miettinen, Lappeenranta (FI)

(73) Assignee: UPM-KYMMENE CORPORATION, Helsinki (FI)

Reexamination Request:
No. 90/014,134, May 3, 2018

Reexamination Certificate for:
Patent No.: 9,719,210
Issued: Aug. 1, 2017
Appl. No.: 14/825,363
Filed: Aug. 13, 2015

Related U.S. Application Data

(62) Division of application No. 13/879,085, filed as application No. PCT/FI2011/050896 on Oct. 14, 2011, now Pat. No. 9,139,606.

(30) Foreign Application Priority Data

Oct. 15, 2010 (FI) ..................................... 20106073
May 11, 2011 (FI) ..................................... 20115452

(51) Int. Cl.
*B01J 3/00* (2006.01)
*B01J 3/02* (2006.01)
*B01J 3/04* (2006.01)
*C07G 1/00* (2011.01)
*D21C 11/00* (2006.01)
*D21C 11/04* (2006.01)
*D21C 11/10* (2006.01)

(52) U.S. Cl.
CPC ............... *D21C 11/10* (2013.01); *B01J 3/00* (2013.01); *B01J 3/02* (2013.01); *B01J 3/042* (2013.01); *C07G 1/00* (2013.01); *D21C 11/0007* (2013.01); *D21C 11/04* (2013.01)

(58) Field of Classification Search
None
See application file for complete search history.

(56) References Cited

To view the complete listing of prior art documents cited during the proceeding for Reexamination Control Number 90/014,134, please refer to the USPTO's public Patent Application Information Retrieval (PAIR) system under the Display References tab.

*Primary Examiner* — Carlos N Lopez

(57) ABSTRACT

In a method for the continuous precipitation of lignin from black liquor black liquor is provided so as to flow as a pressurized flow in a reactor with a dwell time of less than 300 s. An acidifying agent selected from the group of carbon dioxide, acid and their combinations is led to the flow at one or more feeding sites to lower the pH of black liquor. The pH is allowed to decrease by the effect of the acidifying agent in the pressurized flow to the precipitation point of lignin, the pressure of the pressurized flow is abruptly released, and lignin particles are separated from black liquor.

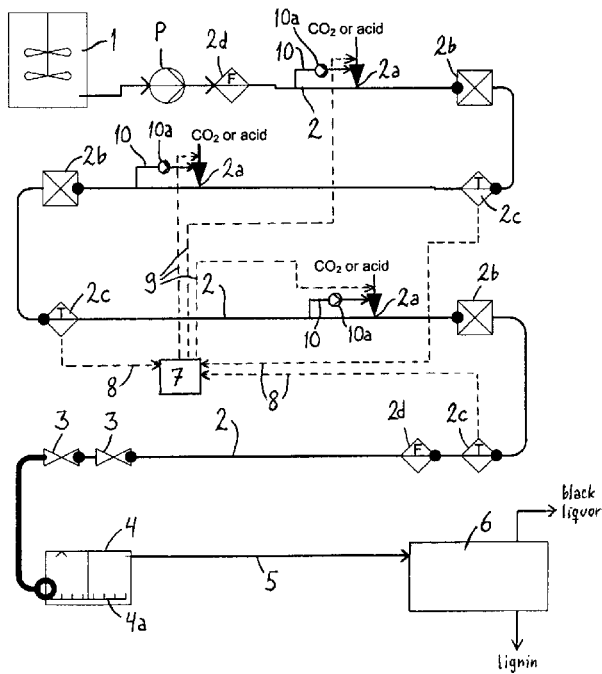

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is determined to be patentable as amended.

Claims 2-12, dependent on an amended claim, are determined to be patentable.

1. An apparatus for the continuous precipitation of lignin from black liquor, the apparatus comprising:

a flow-through reactor and a feeding device leading an acidifying agent into the reactor, wherein the flow-through reactor is a continuous flow-through reactor that includes a pressurized portion wherein black liquor is arranged to flow as a pressurized flow, the pressurized portion includes one or more acidifying agent feeding sites that are connected to a source of acidifying agent to lead the acidifying agent to the pressurized flow at said one or more acidifying agent feeding sites, and the pressurized portion ends at a pressure release valve that is configured to cause an abrupt release of pressure of the pressurized flow such that the black liquor is intensively mixed *and such that the lignin is agglomerated into sufficiently large particles* upon release of the pressure.

* * * * *